United States Patent
Ohmori

(10) Patent No.: US 7,330,207 B2
(45) Date of Patent: Feb. 12, 2008

(54) METHOD OF MANAGING STORAGE SPACE IN A DIGITAL CAMERA

(75) Inventor: Seishi Ohmori, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 720 days.

(21) Appl. No.: 10/736,401

(22) Filed: Dec. 15, 2003

(65) Prior Publication Data

US 2004/0125218 A1   Jul. 1, 2004

(30) Foreign Application Priority Data

Dec. 13, 2002   (KR) .................. 10-2002-0079739

(51) Int. Cl.
*H04N 5/76*   (2006.01)
(52) U.S. Cl. .................. 348/231.2; 348/231.1; 348/231.99; 348/231.7
(58) Field of Classification Search ............. 348/231.2, 348/231.1
See application file for complete search history.

(56) References Cited

U.S. PATENT DOCUMENTS

| | | | | |
|---|---|---|---|---|
| 5,367,332 A | * | 11/1994 | Kerns et al. ............... | 348/61 |
| 5,764,800 A | * | 6/1998 | Yamagata ............... | 382/232 |
| 6,263,106 B1 | * | 7/2001 | Yamagata ............... | 382/232 |
| 6,564,282 B1 | * | 5/2003 | Torres ............... | 711/1 |
| 6,885,395 B1 | * | 4/2005 | Rabbani et al. ............ | 348/231.1 |
| 6,906,751 B1 | * | 6/2005 | Norita et al. ............... | 348/349 |
| 6,961,087 B1 | * | 11/2005 | Yoshida ............... | 348/231.1 |
| 2004/0027461 A1 | * | 2/2004 | Boyd ............... | 348/222.1 |

FOREIGN PATENT DOCUMENTS

| | | |
|---|---|---|
| CN | 1369773 A | 9/2002 |
| JP | 2002-237141 A | 8/2002 |

* cited by examiner

*Primary Examiner*—David Ometz
*Assistant Examiner*—Wanda M. Negrón
(74) *Attorney, Agent, or Firm*—Drinker Biddle & Reath LLP

(57) ABSTRACT

Provided is a digital camera in which a memory card is inserted and image files are stored on the memory card. When a recording capacity of the memory card is insufficient, image files already stored in the memory card are recompressed at a relatively higher compression rate at the request of a user.

20 Claims, 6 Drawing Sheets

METHOD OF MANAGING STORAGE SPACE IN A DIGITAL CAMERA

BACKGROUND OF THE INVENTION

This application claims the priority of Korean Patent Application No. 2002-79739, filed on 13 Dec. 2002, in the Korean Intellectual Property Office, the disclosure of which is incorporated herein in its entirety by reference.

1. Field of the Invention

The present invention relates to a method of managing storage space in a digital camera, more particularly, a digital camera in which a memory card for storing image files is inserted.

2. Description of the Related Art

In typical digital cameras, for example, a digital camera having a model name "Digimax 350SE" which is manufactured by Samsung Techwin Co., Ltd., image files of photographs taken by a user are compressed and stored in a memory card. However, due to a limited capacity of the memory card, only a predetermined number of photographs are stored in the memory card. Accordingly, when the remaining capacity of the memory card is insufficient to store photographs, the user inconveniently selects and deletes the image files stored in the memory card to take new photographs.

SUMMARY OF THE INVENTION

To solve the above and/or other problems, the present invention provides a method of managing storage space in a digital camera by which a user does not need to select and delete image files stored in a memory card when the remaining capacity of the memory card is insufficient According to an aspect of the present invention, a method of managing storage space in a digital camera in which a memory card is inserted and image files are stored in the memory card, wherein, when a recording capacity of the memory card is insufficient, image files already stored in the memory card are recompressed at a relatively higher compression rate at the request of a user.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
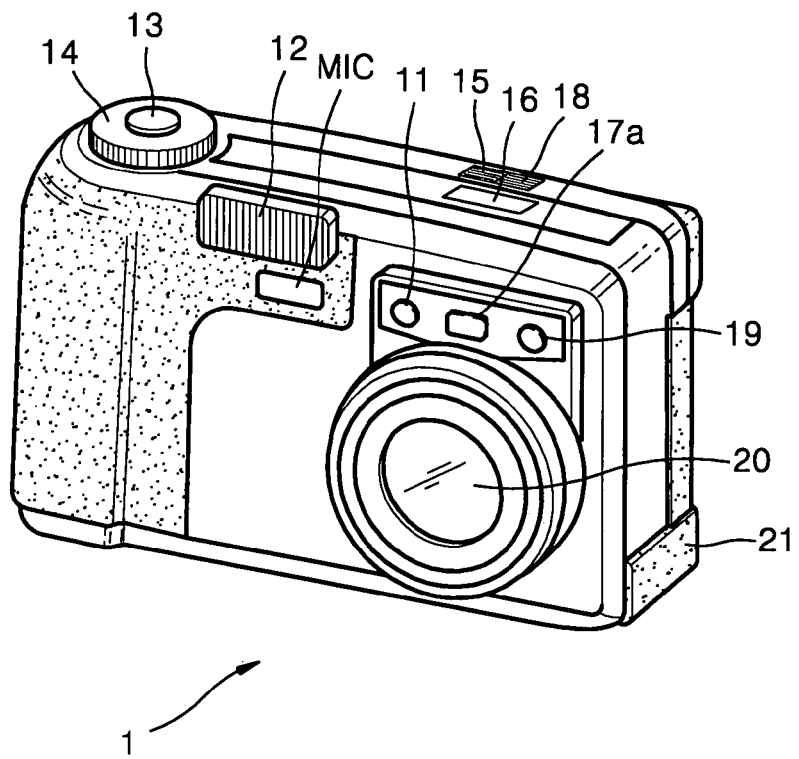
FIG. 1 is a perspective view illustrating the front and upper surfaces of a digital camera according to a preferred embodiment of the present invention.

Referring to FIG. 1, a microphone MIC, a self-timer lamp 11, a flash 12, a shutter button 13, a mode dial 14, a function selection button 15, a photographing information display portion 16, a viewfinder 17a, a function block button 18, a flash light amount sensor 19, a lens portion 20, and an external interface portion 21 are provided in the front and upper surfaces of a digital camera 1 according to a preferred embodiment of the present invention.

The self-timer lamp 11 flickers in a self-timer mode during a set time after the shutter button 13 is pressed until the photographing starts. The mode dial 14 is used for a user to set a variety of modes, for example, a still image photographing mode, a night view photographing mode, a motion picture photographing mode, a reproduction mode, a computer connection mode, and a system setting mode. The function selection button 15 is used for the user to select one of operational modes of the digital camera 1, for example, the still image photographing mode, the night view photographing mode, the motion picture photographing mode, and the reproduction mode. The photographing information display portion 16 displays information of the respective functions related to photographing. The function block button 18 is used for the user to select each function displayed on the photographing information display portion 16.

Figure 2:
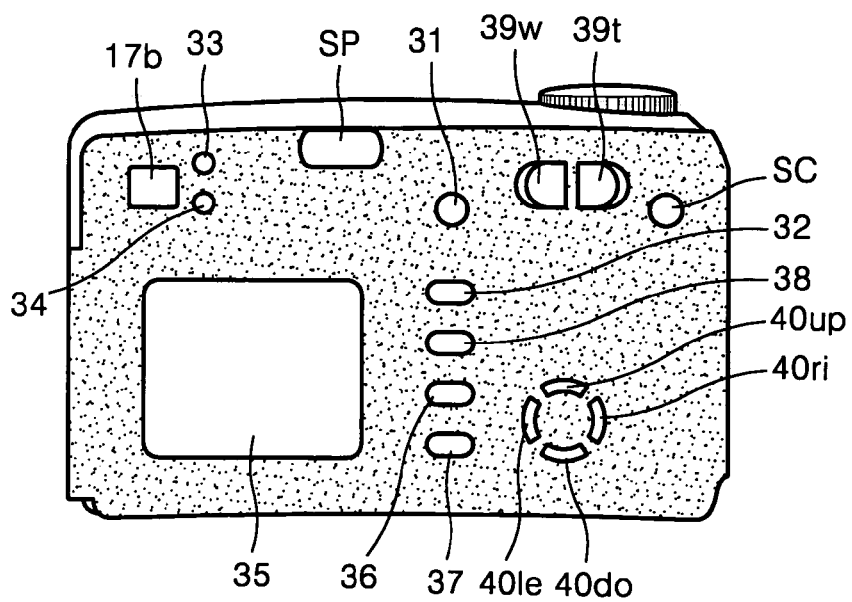
FIG. 2 is a view illustrating the rear side of the digital camera of FIG. 1.

Referring to FIG. 2, a recompression button SC, a speaker SP, a power button 31, a monitor button 32, an auto-focus lamp 33, a viewfinder 17b, a flash ready lamp 34, a display panel 35, a confirm/delete button 36, an enter/play button 37, a menu button 38, a wide angle zoom button 39w, a telephoto zoom button 39t, an up movement button 40up, a right movement button 40ri, a down movement button 40do, and a left movement button 40le are arranged on the rear side of the digital camera 1 according to the present invention.

When the recompression button SC is pressed by a user because the capacity of a memory card (not shown) is insufficient, image files stored in the memory card are recompressed at a higher compression rate at the request of the user. The monitor button 32 is used to control the operation of the display panel 35. For example, when the monitor button 32 is pressed once, an image of an object pictured and photographing information thereof are displayed on the display panel 35. When the monitor button 32 is pressed twice, only an image of the pictured object is displayed on the display panel 35. When the monitor button 32 is pressed a third time, power applied to the display panel 35 is cut off. The auto-focus lamp 33 operates when an input image is well focused. The flash ready lamp 34 is operated when the flash 12 of FIG. 1 is in a ready mode. The confirm/delete button 36 is used as a confirm button or a delete button in a process in which the user sets each mode. The enter/play button 37 is used to input data or for the function of stopping or reproducing in a reproduction mode. The menu button 38 is used to display a menu of a mode selected via the mode dial 14. The up movement button 40up, the right movement button 40ri, the down movement button 40do, and the left movement button 40le are used in the process in which the user sets each mode.

The overall structure of the digital camera of FIG. 1 is described with reference to FIG. 3.

An optical system (OPS) including a lens portion and a filter portion optically processes light from an object to be photographed. The lens portion in the OPS includes a zoom lens, a focus lens, and a compensation lens.

An optoelectric converting portion (OEC) of a charge coupled device (CCD) or complementary metal-oxide-semiconductor (CMOS) converts light from the OPS to an electric analog signal. The DSP 507 controls a timing circuit 502 so that the operation of the OEC and an analog-to-digital converting portion is controlled. A correlation double sampler and analog-to-digital converter (CDS-ADC) device 501 is the analog-to-digital converting portion. The CDS-ADC processes an analog signal from the optoelectric converting portion OEC to remove high frequency noise and adjust the amplitude, and converts the processed analog signal to a digital signal. The DSP 507 generates a digital image signal classified by brightness and chromaticity signals, by processing the digital signal from the CDS-ADC device 501.

The digital image signal from the DSP 507 is temporarily stored in a DRAM 504. The algorithm and set data needed for the operation of the DSP 507 is stored in an EEPROM 505. A memory card of a user is inserted into or detached from a memory card interface 506.

A digital image signal from the DSP 507 is input to an LCD driving portion 514 so that an image is displayed on the color LCD panel 35.

The digital image signal from the DSP 507 can be transmitted through a USB (universal serial bus) connection portion 21a or an RS232C interface 508 with a connection portion 21b thereof, as a serial communication, or a video filter 509 with a video output portion 21c, as a video signal.

An audio processor 513 outputs a voice signal from a microphone MIC to the DSP 507 or the speaker SP and outputs an audio signal from the DSP 507 to the speaker SP.

The user input portion INP includes the recompression button SC of FIG. 2, the shutter button 13 of FIG. 1, the mode dial 14 of FIG. 1, the function selection button 15 of FIG. 1, the function block button 18 of FIG. 1, the monitor button 32 of FIG. 2, the confirm/delete button 36 of FIG. 2, the enter/play button 37 of FIG. 2, the menu button 38 of FIG. 2, the wide angle zoom button 39w of FIG. 2, the telephoto zoom button 39t of FIG. 2, the up movement button 40up of FIG. 2, the right movement button 40ri of FIG. 2, the down movement button 40do of FIG. 2, and the left movement button 40le of FIG. 2.

The microcontroller 512 controls the lens driving portion 510. Accordingly, the zoom motor $M_Z$, the focus motor $M_F$, and the aperture motor $M_A$ respectively drive the zoom lens, the focus lens, and the aperture in the OPS. A light emitting portion LAMP driven by the microcontroller 512 includes the self-timer lamp 11, the auto focus lamp 33, and a flash ready lamp 34. The microcontroller 512 controls the operation of the flash controller 511 according to the signal from the flash light amount sensor 19.

When a recompression command signal is received from the recompression button SC of the user input portion INP, the microcontroller 512 controls the digital signal processor 507 in order to recompress the image files stored in the memory card at a higher compression rate.

Figure 3:
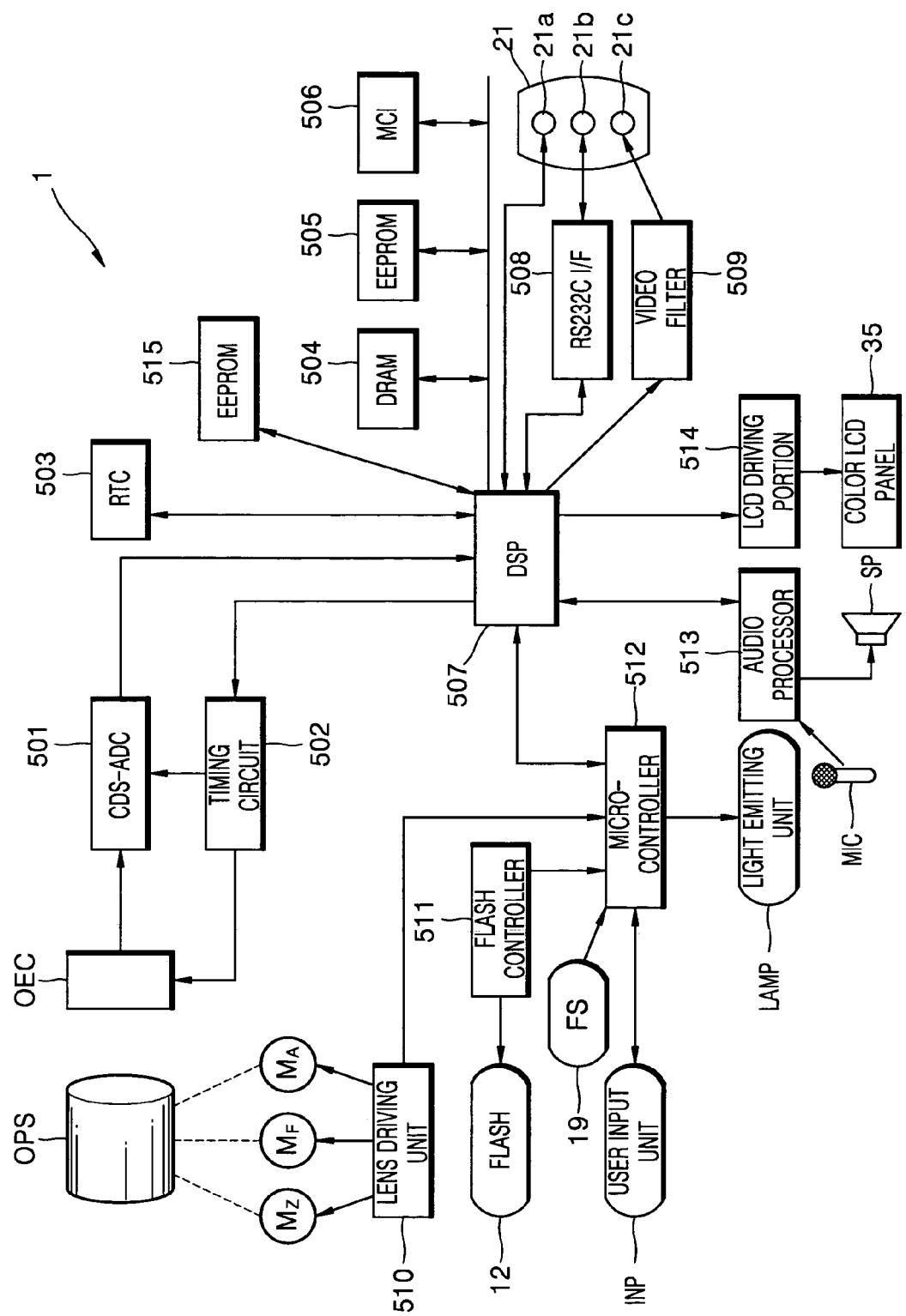
FIG. 3 is a view illustrating the overall structure of the digital camera of FIG. 1.
Figure 4:
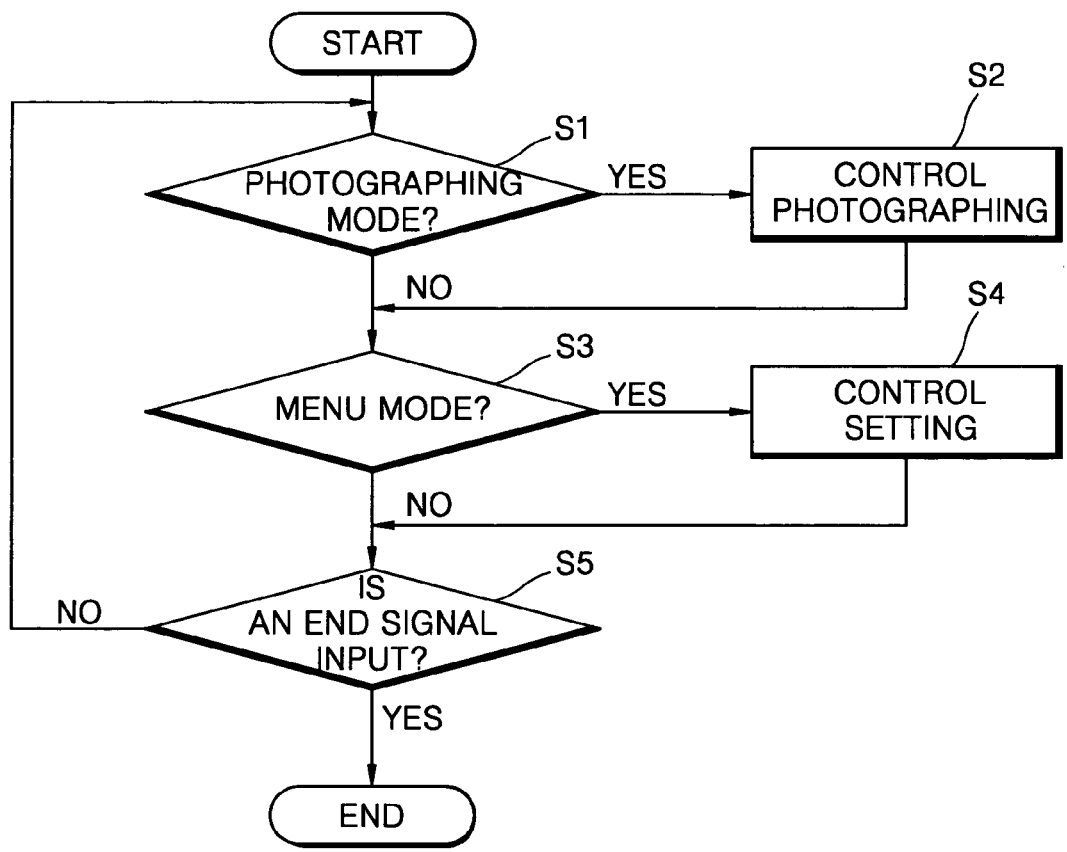
FIG. 4 is a flow chart for explaining the overall control algorithm of the microcontroller of FIG. 3.

FIG. 4 shows the overall control algorithm of the microcontroller 512 of FIG. 3. Referring to FIG. 4, the microcontroller 512 performs a photographing control step according to the operation of a user when a photographing mode is set by the user (Steps S1 and S2). When a menu mode is set by the user, a setting control step is performed to set operational conditions of a camera according to the operation of the user (Step S3 and S4). The above steps are repeated until an external end signal is input (Step S5).

Figure 5:
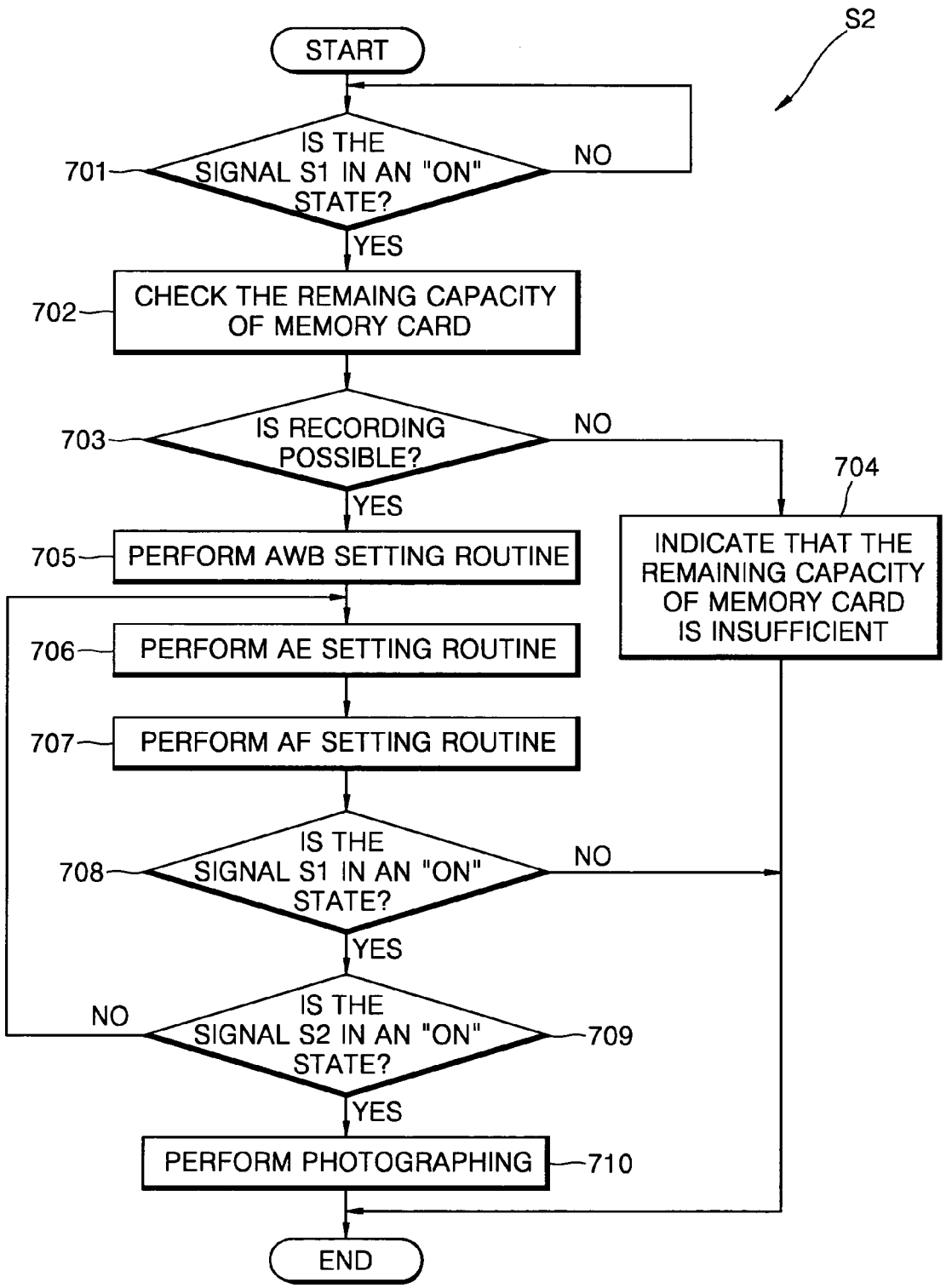
FIG. 5 is a flow chart for explaining the detailed algorithm of the photographing control step of FIG. 4.

FIG. 5 shows a detailed algorithm of the photographing control step S2 of FIG. 4. The shutter button 13 included in the user input portion INP has a two-step structure. That is, when a user presses the shutter button 13 to a first step after operating the wide angle zoom button 39w or telephoto zoom button 39t, a first signal S1 from the shutter button 13 is turned on and, when the user presses the shutter button 13 to a second step, a second signal S2 from the shutter button 13 is turned on. Thus, the photographing control algorithm of FIG. 5 starts when the user presses the shutter button 13 to the first step (Step 701).

Referring to FIGS. 3 and 5, in the algorithm of the photographing control step (Step S2 of FIG. 5), when the signal S1 is turned on (Step 701), the remaining capacity of the memory card is checked (Step 702). Then, it is determined whether the remaining capacity of the memory card is sufficient for recording a digital image signal (Step 703). If the remaining capacity is not sufficient for recording, a message indicating insufficient capacity of the memory card is displayed (Step 704).

If the remaining capacity is sufficient for recording, first, an automatic white balance (AWB) mode is performed to set related parameters (Step 705). Next, an automatic exposure (AE) mode is performed so that the amount of exposure with respect to incident luminance is calculated. The aperture drive motor $M_A$ is driven according to the calculated exposure amount (Step 706). Next, an automatic focusing mode (AF) mode is performed, and the present position of the focus lens FL is set (Step 707).

Next, it is determined whether the signal S1, which is a first step signal from the shutter button 13, is in an "ON" state (Step 708). If the signal S1 is not in the "ON" state, because the user does not have an intention to take a photograph, the execution program is terminated. If the signal S1 is in the "ON" state, it is determined whether the signal S2 is in the "ON" state (Step 709). If the signal S2 is not in the "ON" state, because the user does not press the second step of the shutter button 13 to take a photograph, the execution program is moved to Step 706.

If the signal S2 is in the "ON" state, because the user presses the second step of the shutter button 13 to take a photograph, a photographing operation is performed (Step 710). That is, the microcontroller 512 operates the DSP 507 so that the optoelectric converting portion OEC and the CDS-ADC device 501 are operated by the timing circuit 502. Next, image data is converted and compressed by the digital signal processor 507. The compressed image file is stored in the memory card through the memory card interface 506.

Figure 6:
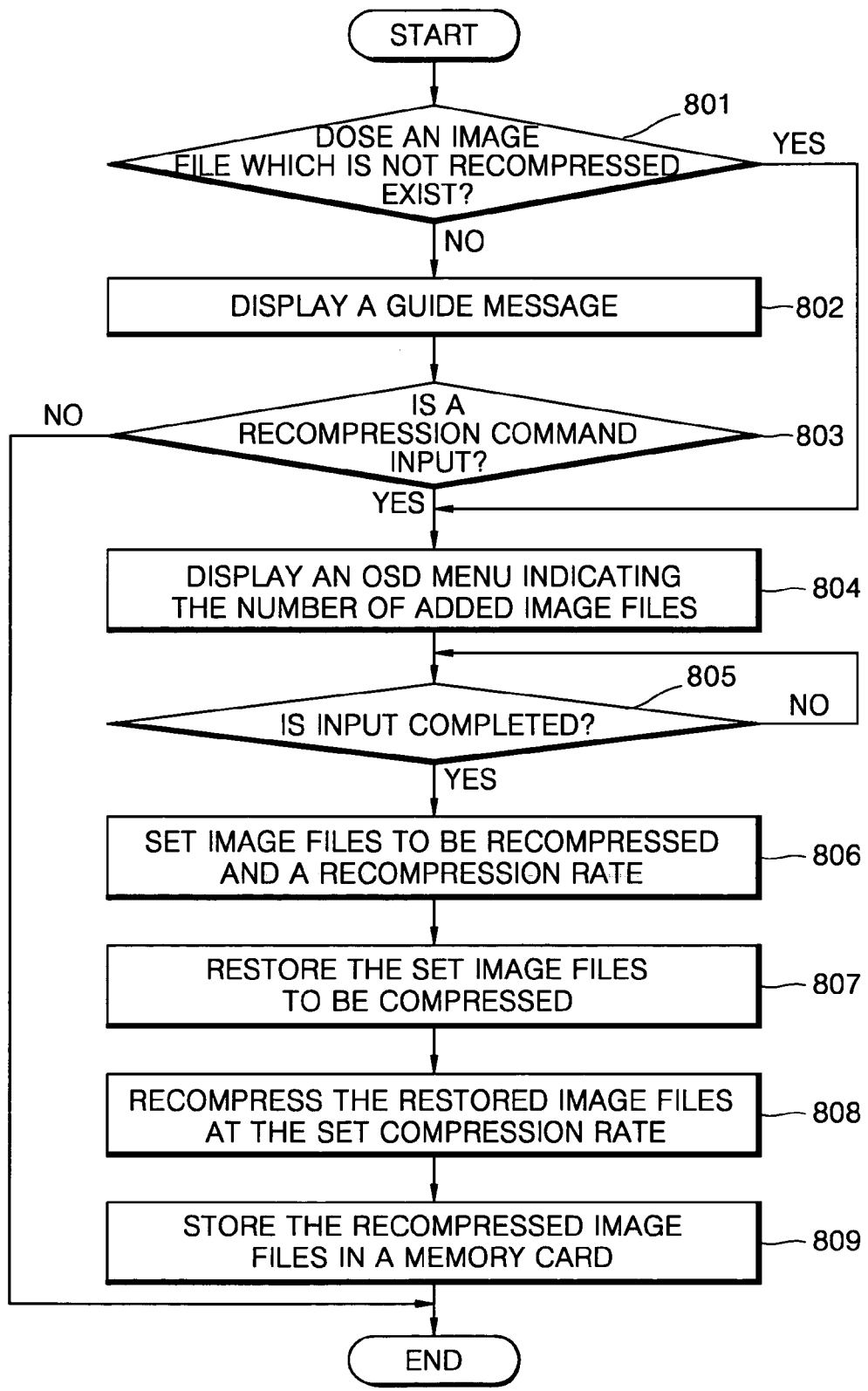
FIG. 6 is a flow chart for explaining the control algorithm of the microcontroller of FIG. 3 when a recompression command signal is input by a user due to an insufficient capacity of the memory card.
Figure 7A:
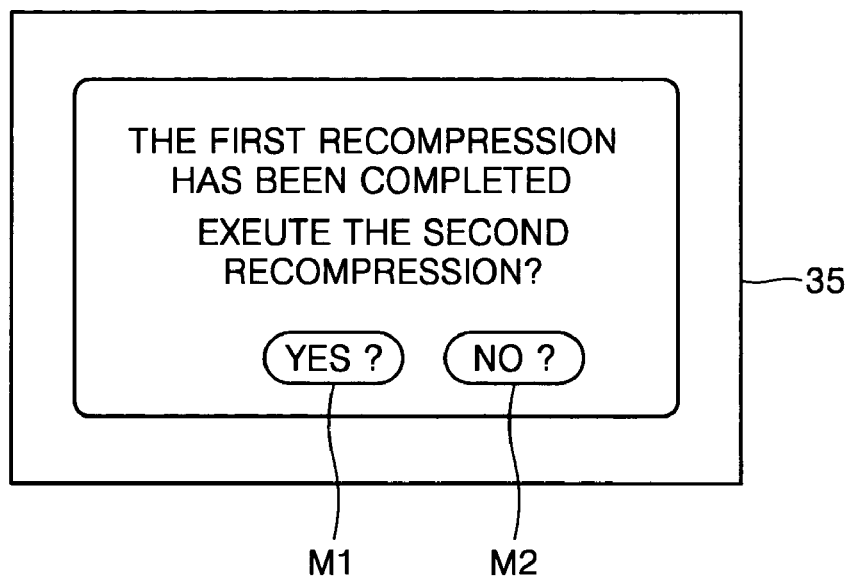
FIG. 7A is a view illustrating a screen displayed on the color LCD panel according to the execution of Step 802 of FIG. 6.

When photographing is not possible in view of the results of the above steps 702 and 704, the user presses the recompression button SC to increase the remaining capacity of the memory card. The algorithm of the microcontroller 512 is described below with reference to FIGS. 6 through 7B.

When a recompression command signal is input by pressing the recompression button SC, the existence of an image file that is not recompressed is verified (Step 801). If there is an image file that is not recompressed, Steps 804 through 809, which are described below, are executed. Otherwise, a related guide message is displayed on the color LCD panel 35 (Step 802, refer to FIG. 7A). For example, a guide message indicating that "The first recompression has been completed. Execute the second recompression?" is displayed. When the user presses a "YES?" button M1 to generate a recompression command signal, Steps 804 through 809, to be described below, are executed. Otherwise, when the user presses a "NO?" button M2, the execution of algorithm is terminated (Step 803).

Figure 7B:
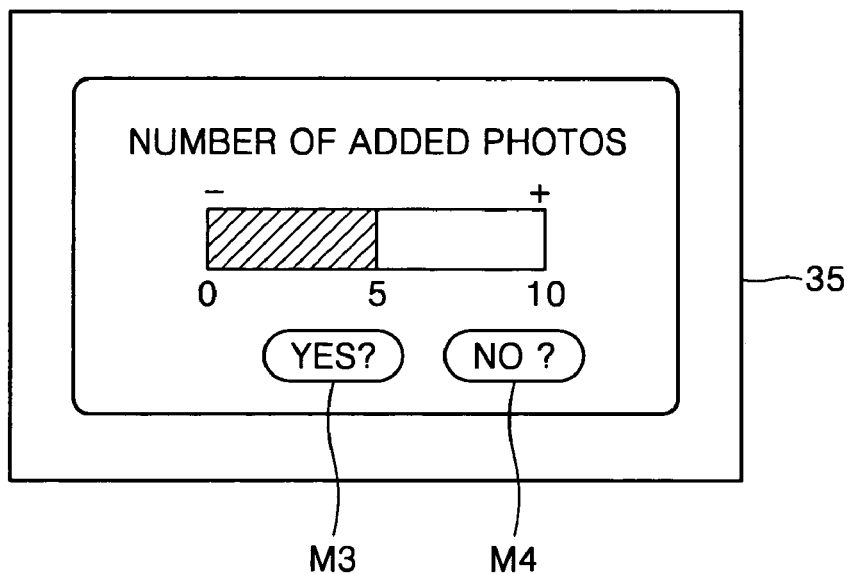
FIG. 7B is a view illustrating a screen displayed on the color LCD panel according to the execution of Step 804 of FIG. 6.

In step 804, an OSD menu is displayed, indicating the number of image files to be added (Step 804, refer to FIG. 7B). The user is able to set the number of photographs, or image files, to be added, by using the right movement button 40ri of FIG. 2 and the left movement button 40le of FIG. 2. in the above setting step, when the user presses a "YES?" button M3 to normally generate an input end signal, Steps 806 through 809 are executed (Step 805). When a cancel signal of a "NO?" button M4 is generated, the execution of the algorithm is terminated.

In Step 806, the particular image files to be recompressed and a compression rate thereof are set according to the number of added image files input by the user. For example, when a reference compression rate of 100% is applied and the user wishes to take three more photographs, fifteen image files are set to be recompressed and the compression rate thereof is 120%.

Next, the image files set in Step 806 are restored (Step 807). The image files restored in Step 807 are recompressed at a set compression rate (Step 808). The recompressed image files in Step 808 are stored in the memory card through the memory card interface 506.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of managing storage space in a digital camera, the method comprising:
   (a) allowing a user to set a number of image files to be added to a recording medium of the digital camera;
   (b) automatically calculating how many and which existing image files should be recompressed and the rate at which recompression should occur so as to create sufficient storage space in the recording medium to store the number of additional files set by the user;
   (c) restoring the image files selected to be recompressed;
   (d) recompressing the restored image files at the determined recompression rate;
   (e) storing the recompressed image files in the recording medium.

2. The method of claim 1, further comprising the steps of:
   (f) determining whether an image file exists that is not already recompressed;
   (g) if an image file exists that has not been recompressed, displaying a menu indicating the number of files to be added to the recording medium of the digital camera and proceeding to step (h);
   (h) if all existing image files have been recompressed, displaying a message indicating that all existing image files have been recompressed and asking the user for permission to further recompress existing image files;
   (i) determining whether the user has granted permission to further recompress existing image files;
   (j) if the user denies permission, terminating the method;
   (k) if the user grants permission, displaying a menu indicating the number of files to be added to the recording medium of the digital camera.

3. The method of claim 2, further comprising the step of:
   (l) determining if a recompression function has been selected.

4. The method of claim 3, wherein step (l) comprises determining whether a recompression button has been pressed.

5. The method of claim 4, wherein the recording medium is compact flash card.

6. The method of claim 3, wherein step l is performed first, and steps f, g, h, i, j, and k are performed before steps a, b, c, d, and e.

7. The method of claim 2, wherein steps f, g, h, i, j, and k are performed before steps a, b, c, d, and e.

8. The method of claim 1, wherein the recording medium is removable from the digital camera.

9. The method of claim 1, wherein the recording medium is a memory card.

10. The method of claim 1, wherein the recording medium is a memory stick.

11. The method of claim 1, wherein the recompression utilizes the JPEG standard.

12. The method of claim 1, wherein the digital camera includes a display unit.

13. The method of claim 12, wherein the display unit is an LCD screen.

14. The method of claim 1, wherein images with lower compression ratios are selected for recompression before images with higher compression ratios.

15. A method of managing storage space in a digital camera comprising:
   receiving a signal from a user to take a photograph;
   checking the remaining storage capacity of a memory card to determine if there is sufficient space to record an image file corresponding to the photograph;
   if the remaining storage capacity is insufficient, receiving input from a user as to the number of new photographs the user wants to take;
   automatically determining the existing images files to be recompressed and the recompression ratios for each existing image file to be recompressed in order to free up enough space on the memory card to accommodate the number of new photographs selected by the user;
   restoring the existing image files to be recompressed;
   recompressing the existing image files;
   storing the recompressed image files on the memory card.

16. The method of claim 15 wherein the digital camera includes a display unit.

17. The method of claim 16 wherein the display unit is an LCD screen.

18. The method of claim 15 wherein the recompression uses the JPEG standard.

19. The method of claim 15 wherein the digital camera includes a recompression button.

20. The method of claim 15 wherein images with lower compression ratios are selected for recompression before images with higher compression ratios.

* * * * *